(12) United States Patent
McKenna

(10) Patent No.: US 6,556,948 B1
(45) Date of Patent: Apr. 29, 2003

(54) APPARATUS FOR LOGGING DATA ASSOCIATED WITH FEED INGREDIENTS AND RATIONS FOR DELIVERY TO FEEDLOTS

(76) Inventor: Paul A. McKenna, #7, 3600 - 19th Street NE, Calgary, Alberta (CA), T6E 6V2

(*) Notice: Subject to any disclaimer, the term of this patent is extended or adjusted under 35 U.S.C. 154(b) by 45 days.

(21) Appl. No.: 09/633,444

(22) Filed: Aug. 7, 2000

(51) Int. Cl.⁷ .............................................. G06F 15/02
(52) U.S. Cl. .................. 702/173; 119/51.02; 119/51.01
(58) Field of Search ........................ 702/173; 119/51.02, 119/51.01, 57.92, 57.4, 57.1; 700/219, 221; 705/28, 414, 416; 177/3, 4, 5, 7

(56) References Cited

U.S. PATENT DOCUMENTS 5,008,821 A * 4/1991 Pratt et al. ................ 119/51.01
5,457,627 A 10/1995 Cureton et al.

* cited by examiner

Primary Examiner—John Barlow
Assistant Examiner—Stephen J. Cherry
(74) Attorney, Agent, or Firm—Young & Basile, P.C.

(57) ABSTRACT

A data logging device for logging data associated with feed ingredients added to and feed ration removed from a feed delivery vehicle having a feed container and an electronic weigh scale for generating a signal representative of the weight of feed in the container, comprising: a display and user input device; means responsive to an increase in the signal for displaying the weight of material added to the container and responsive to input of an ingredient identification code for storing the the identification code and the weight of a feed ingredient added to the container; means responsive to a decrease in the signal for displaying the weight of feed ration discharged from the container and responsive to an input animal pen identification code for storing the pen identification code and the weight of material discharged at the animal pen; means for calculating the weight of each ingredient previously loaded into the container contained in the ration discharged at the pen; and means for storing the weight of each ingredient loaded into the container contained in the ration discharged at the pen in association with the pen identification code and the weight of material discharged at the animal pen.

4 Claims, 5 Drawing Sheets

Fig. 4

| 10 | Set | Date | | | | | |
|---|---|---|---|---|---|---|---|
| | 1 | 02/19 | | | | | |

| | | Ingredient | Ingredient A | Ingredient B | Ingredient C | Ingredient D | |
|---|---|---|---|---|---|---|---|
| | | Weight | 100 | 200 | 300 | 400 | |
| | | Time | 9:00 am | 9:10 am | 9:20 am | 9:30 am | |

| Date | Pen ID | | | | | | Ration ID |
|---|---|---|---|---|---|---|---|
| 02/19 | 1 | 300 | 30 | 60 | 90 | 120 | 1 |
| 02/19 | 2 | 100 | 10 | 20 | 30 | 40 | 1 |
| 02/19 | 3 | 200 | 20 | 40 | 60 | 80 | 1 |
| 02/19 | 4 | 400 | 40 | 80 | 120 | 160 | 1 |

| | Set | Date | | | | | |
|---|---|---|---|---|---|---|---|
| | 2 | 02/19 | | | | | |

| | | Ingredient | a | b | c | d | |
|---|---|---|---|---|---|---|---|
| | | Weight | 1000 | 2000 | 3000 | 4000 | |
| | | Time | 11:00 am | 11:10 am | 11:20 am | 11:30 am | |

| Date | Pen # | | | | | | Ration ID |
|---|---|---|---|---|---|---|---|
| 02/19 | 1 | 8000 | 800 | 1600 | 2400 | 3200 | 1 |
| 02/19 | 2 | 2000 | 200 | 400 | 600 | 800 | 1 |

Fig. 5

| Count | Set # | Date | Time | Pen # | Ration | Weight |
|---|---|---|---|---|---|---|
| 1 | 1 | 02/19 | 2:00 pm | 34 | 12 | 3000 |
| 2 | 1 | 02/19 | 2:10 pm | 78 | 56 | 4000 |
| 3 | 2 | 02/19 | 2:20 pm | 12 | 45 | 5000 |
| 4 | 2 | 02/19 | 2:30 pm | 56 | 21 | 6000 |

APPARATUS FOR LOGGING DATA ASSOCIATED WITH FEED INGREDIENTS AND RATIONS FOR DELIVERY TO FEEDLOTS

The present invention generally relates to an apparatus and a method for recording material added to and removed from a vehicle-mounted container and, more specifically, to an apparatus and method for recording feed delivered to pens in feedlots on an ingredient per pen basis.

BACKGROUND OF THE INVENTION

The majority of beef in North America is produced en masse in facilities known as feedlots in which cattle are sorted according to age, type, owner and various other criteria into pens which average around 200 animals each. A large feedlot may contain 80,000 animals sorted into 400 pens. Within a feedlot, feed is formulated from a recipe comprising a number of different ingredients. Generally, ingredients are loaded in vehicles at a central loading site and delivered to individual pens. Some feedlots may pre-mix the ingredients before loading the mixture into the truck, while others may load the individual ingredients into vehicles having a vehicle-mounted feed mixer. The vehicles typically include a weigh scale having transducers which generate a signal representative of the weight of the feed in the vehicle container and display the weight on an electronic digital display to enable the vehicle operator to determine the quantity of feed to discharge into the feedbunker at each pen. It is also known to provide vehicle mounted devices associated with weigh scales for storing weight, pen and ration identification numbers. Such information may be stored in a memory associated with the scale indicator, or may be transmitted via a wireless or other such communications link to an office computer.

Sophisticated computer systems for managing feedlot operations are known in the art. Cureton et al U.S. Pat. No. 5,457,627 granted on Oct. 10, 1995 for "Feedlot Computer Network Installation and Interactive Method of Using the Same to Assign Feed Loads and Animal Pen Substances to Feed Delivery Vehicles Available at a Feedmill in the Feedlot" discloses such a system.

However, it has been found that existing systems do not provide a mechanism for quickly and automatically logging the feed delivered to a pen on an ingredient per pen basis.

SUMMARY OF THE INVENTION

One aspect of the present invention relates to a data logging device for logging data associated with material added to and removed from a material transport vehicle having a material container and an electronic weigh scale for generating a signal representative of the weight of material in said container, comprising a display and user input device; means responsive to an increase in said signal for displaying the weight of material added to said container and responsive to input of a material identification code for storing the said identification code and the weight of material added to said container; and means responsive to a decrease in said signal for displaying the weight of material discharged from said container and responsive to a input destination site identification code for storing said destination site and the weight of material discharged at said site.

Another aspect of the present invention relates of a method of logging data respecting the addition and removal of material to and from a material transport vehicle.

BRIEF DESCRIPTION OF THE DRAWINGS

These and other features of the invention will become more apparent from the following description in which reference is made to the appended drawings in which:

FIGS. 4 and 5 illustrate two sample reports of data extracted from the data logging device according to one embodiment of the present invention.

Detailed Description of Preferred Embodiments of the Invention

By way of background and as previously mentioned, animal feedlots generally include a plurality of animal pens, a feed storage site for storing stockpiles of various feed ingredients, and a central office having a computer system for managing the feedlot operation. Each pen is numbered and provided with a feed bunker from which the animals feed. The operation also includes feed delivery vehicles, each having an identification number, for transporting pre-determined quantities and compositions of feed from the feed storage site to individual pens. The feed storage sites are provided with front-end loaders or the like for loading predetermined weights of individual ingredients into the feed delivery vehicles.

The feed delivery vehicles include a container mounted on the vehicle frame, the container including a mixer for mixing the ingredients into a homogenous blend, called a "ration", and a discharge mechanism, such as an auger, for discharging feed into the feed bunkers. The feed delivery vehicles also include an electronic weigh scale having transducers mounted between the vehicle container and frame in known fashion for producing an electrical signal representative of the weight of material in the container and a control unit having a memory, a digital display for displaying the weight of the contents of the container and other information and a user input mechanism in the form of a keypad or pushbuttons for use by the vehicle operator in inputting information, such as vehicle, ingredient and pen identification codes, into the unit for storage in the memory for later transfer to the computer system in the central office.

It has been found that it would be beneficial to automatically log individual ingredients loaded into the delivery vehicles and delivered to individual pens on an ingredient per pen basis. The present invention provides a data logging device capable of meeting this need.

Figure 1:
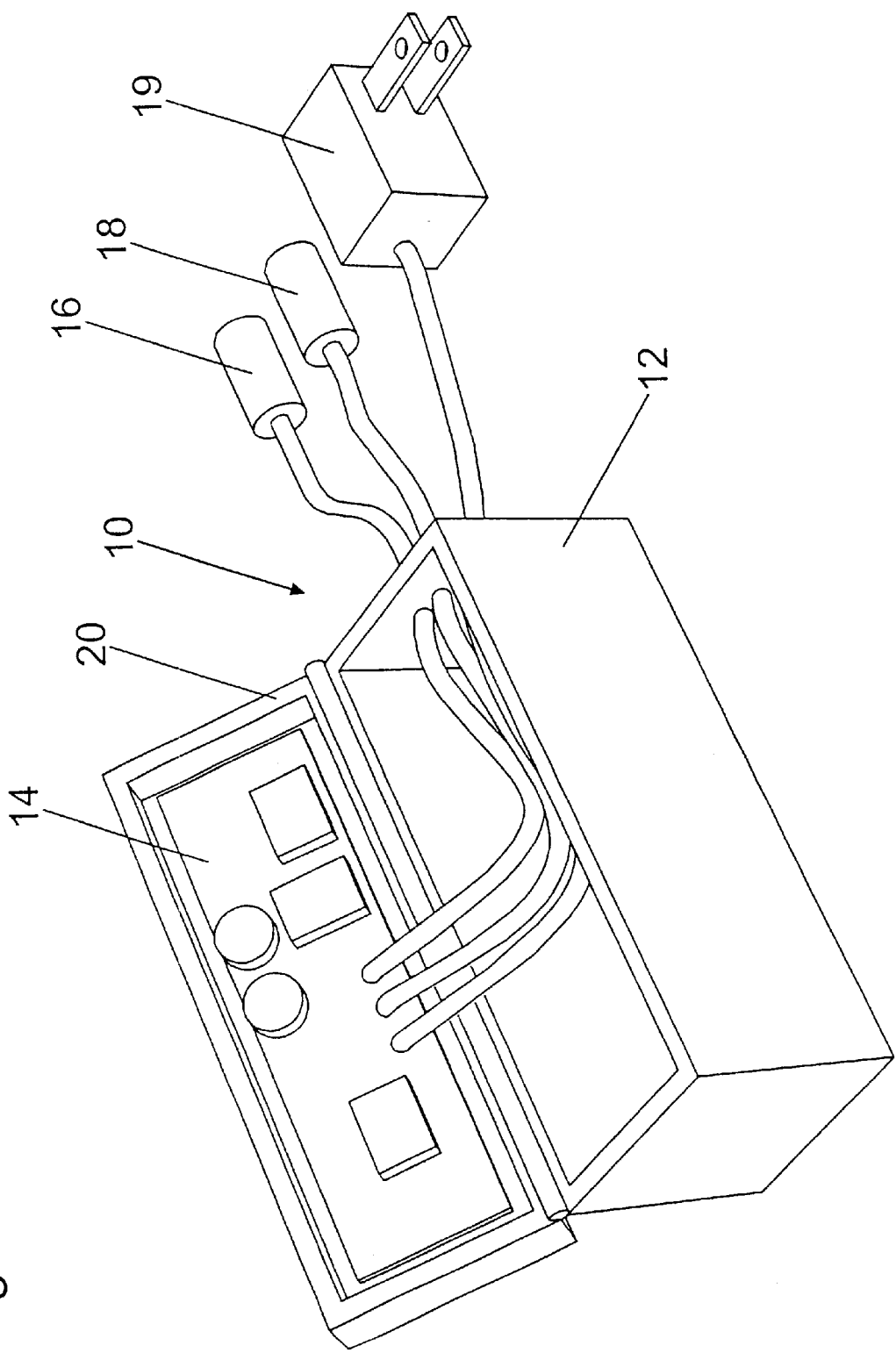
FIG. 1 is a diagrammatic, perspective view of a data logging device according to one embodiment of the present invention.
Figure 2:
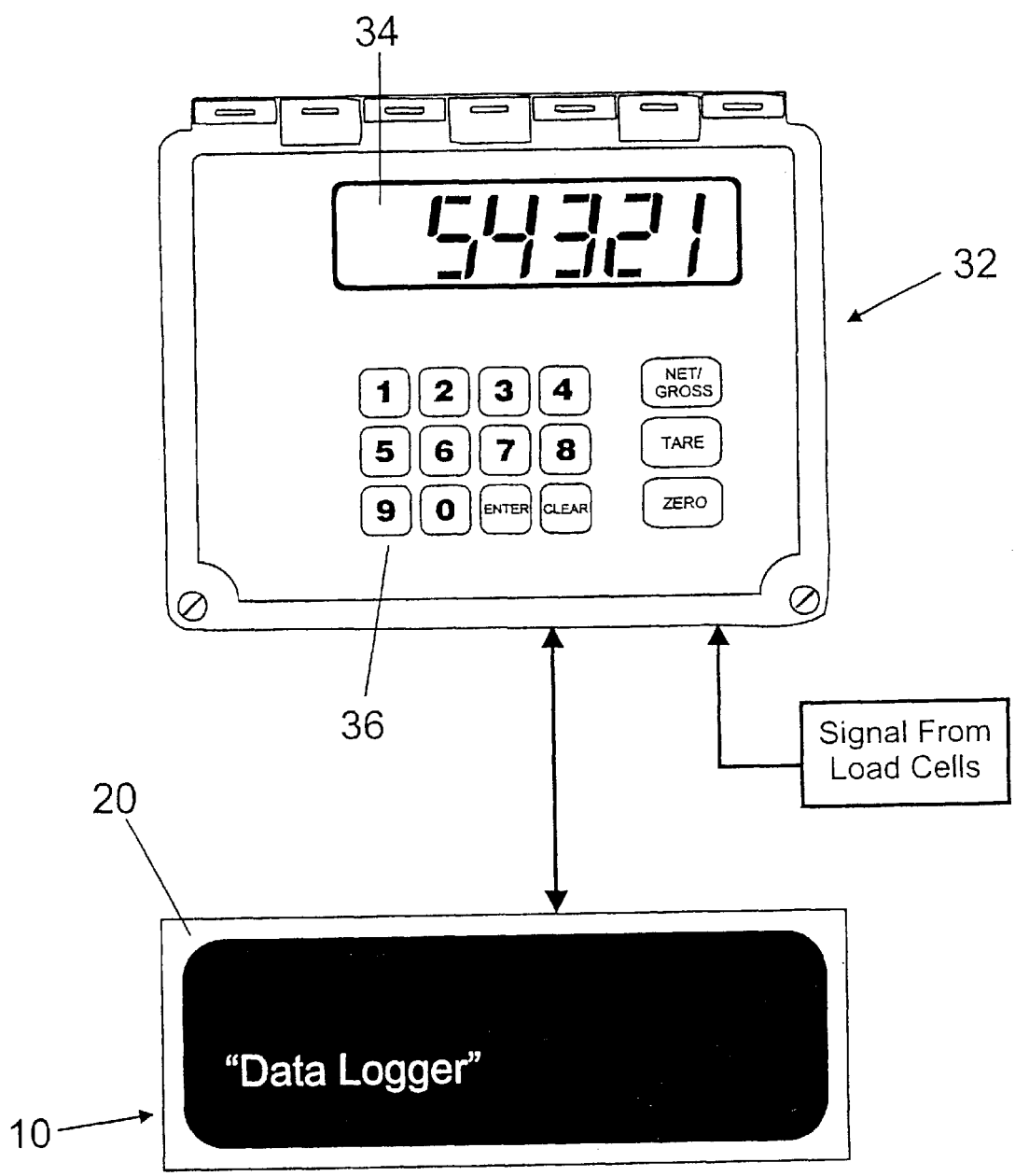
FIG. 2 is an elevational view of the data logging device of FIG. 1 and of a control and display unit.

Referring to FIG. 1, the data logging device 10 of the present invention generally comprises a weatherproof housing 12 containing a circuit board 14 having a first cable 16 for connecting the unit to a weigh scale (not shown) and vehicle electrical power supply, a second cable 18 for connecting the unit to the central computer (not shown) and an a.c. adaptor 19 for connection to an a.c. power supply. The housing 12 includes a suitable lid 20 to provide access to the circuit board 14. The housing is removably secured to and at any suitable and convenient location on a vehicle (not shown) so that, when it is desired to download data from the unit to the office computer system, the unit is simply disconnected from the vehicle power supply, carried into the central office and connected to the central computer. It is to be understood, however, that the present invention contemplates other methods of downloading data to the central computer. The system may also include an optional printer and an uninterruptible Power Supply (UPS).

Figure 3:
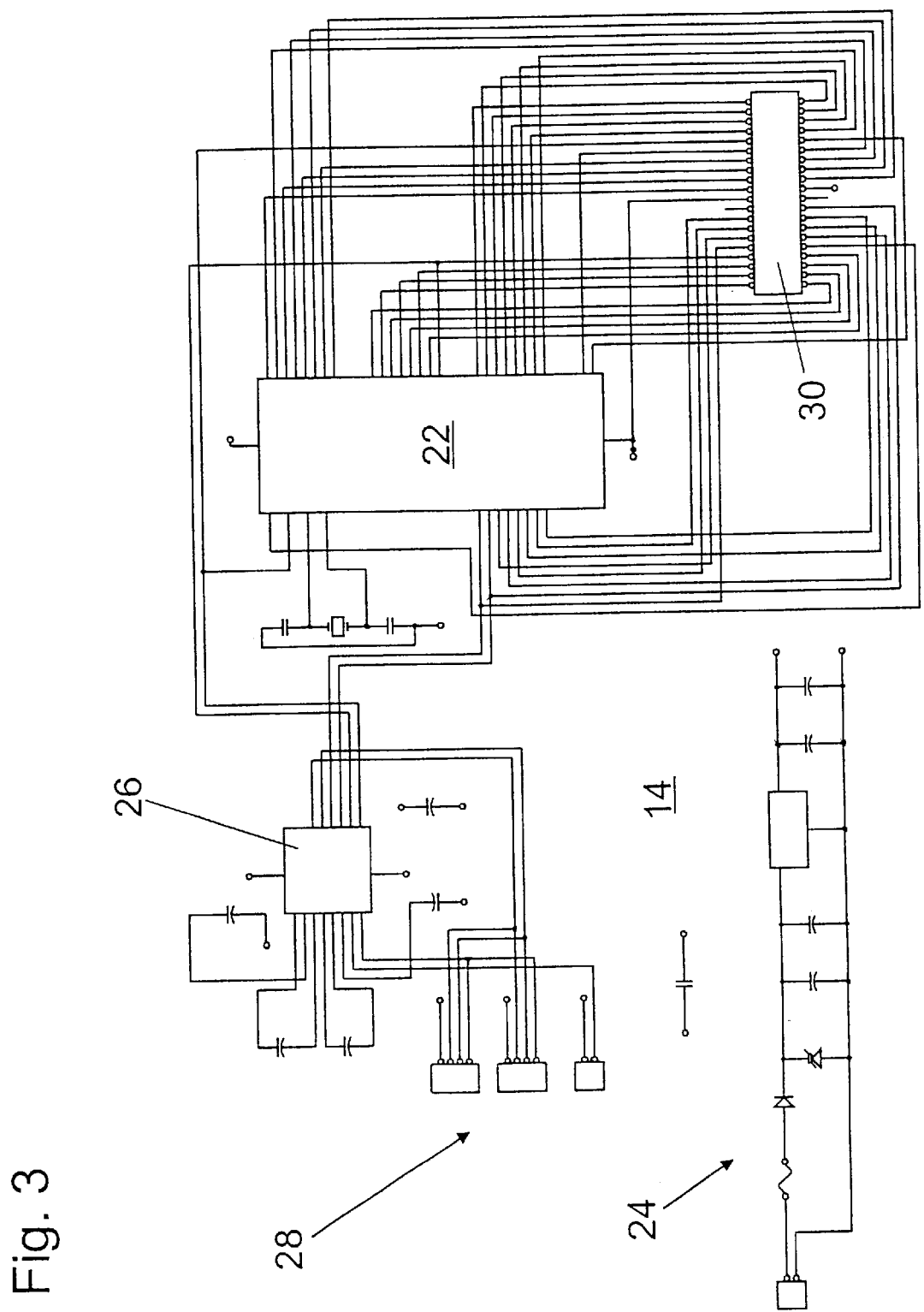
FIG. 3 is an electrical schematic drawing of a data logging electrical circuit according to one embodiment of the present invention.

As shown in FIG. 3, the circuit board includes a microcontroller chip 22 having built-in Random Access Memory (RAM) for storing data and running a program stored in a Programmable Read-Only Memory (ROM), time capabilities and battery back-up. The circuit board further includes a power supply circuit 24, a communications buffer or translator chip 26, which provides protection for the microcontroller and translates the 5 volt voltage required by the microcontroller to the levels required for communications, a number of external connectors, generally designated by reference numeral 28, for connecting the cables mentioned earlier and an expansion connector 30 for connecting the circuit to a card reader, GPS or digital radios or the like, if desired.

Truck connect cable 16 is mounted in the truck in close proximity to a display and user input device 32 and includes a power cable, a serial cable to connect the unit to the indicator and a printer cable to connect the unit to an optional printer (not shown). The office connect cable 18 connects the unit to the serial port a personal computer in the office consists of a serial cable. Device 32 includes a display 34 and a keypad 36 for inputting data into the data logging unit as will be explained.

Data logging unit 10 is operable in generally two modes, namely, a data capture mode and a data output mode.

Data Capture Mode

The data logging unit operates in the data capture mode during feed loading and delivery operations, after the unit has been electrically connected to the vehicle. During these operations, predetermined quantities or weights of individual ingredients are loaded into the vehicle container, mixed to form a homogenous blend called a "ration", as previously mentioned, and then delivered to one or more animal pens. This process is referred to as a "set" herein.

In general, the unit is programmed to store a vehicle identification code and, for each set, store a ration identification code, an ingredient identification code for each ingredient loaded into the container, the weight of each such ingredient, and the date and time of loading of each ingredient, and a pen identification code, the weight of each ingredient discharged from the container and the date and time of discharging of each ration or part thereof. By virtue of its connection to the weigh scale, the unit is capable of automatically reading the weight of ingredients added to and of the ration discharged from the container.

An important aspect of the invention relates to the manner in which the unit responds to changes in weight when operating in the data capture mode. Specifically, the unit associates positive changes in weight, i.e. increases in weight, with the loading of ingredients into the container and associates negative changes in weight, i.e. decreases in weight, with discharging of ration into feed bunkers. These features, in turn, initiate certain functions described below which both facilitate the feed loading and delivery process and ensure data integrity. Further, the unit associates a positive weight change following a negative weight change with the beginning of a new set, i.e. a new loading-unloading cycle.

In the loading phase of a set, the unit determines the net weight of material loaded and awaits user input of an ingredient identification code. When the operator enters the code, the unit stores the ingredient identification code, the net weight of the ingredient loaded, the date and time, and, briefly displays the total weight of ingredients thusfar loaded in the set and then zeroes the display. In this way, the operator is able to quickly and easily determine both the weight of ingredient loaded and total weight of the ration. This unit continues to respond in this manner until it detects a negative change in weight which signals the beginning of the discharge phase of a set.

During the discharge phase when the operator operates a discharge auger, negative weight values appear on the display. In this phase, the unit awaits input of a pen identification code. As the ration is being discharged, the display shows the weight of ration discharged at the current pen so that a precise amount of ration can be discharged. When the operator enters a pen identification code, the unit automatically stores the pen identification code, the weight of ration, a negative number, discharged into the feed bunker of the pen and the date and time, briefly displays the total weight of ration discharged in the set and then, zeroes the display.

Since the unit stores the weight of each of the ingredients loaded into the container, it is capable of determining the weight of each ingredient delivered to each pen by multiplying the ratio of the weight of the ingredient loaded in the current set to the total weight of all ingredients by the weight of ration discharged at the pen.

As mentioned, the unit is designed to record a vehicle identification code. This may be achieved by the operator entering a special code or command into the keypad which causes the unit to prompt the operator for the vehicle identification code. Alternatively, if the vehicle code has not been entered when a new set is initiated, the unit will prompt the operator for the vehicle code. The unit may be programmed to automatically enter set and ration identification codes or may prompt the operator for same when required.

Data Output Mode

At some point in time, it will be desired to download the data from the data logging unit into a central or office computer. To do so, in accordance with one embodiment of the invention, the data logger is disconnected from the vehicle, brought into the office and connected to the office computer connect cable mentioned earlier. A "Feed Manager" program in the office computer is then executed. One of the options associated with the program is a command to retrieve the data from the data logger unit. Executing that command results in a tabular output similar to that illustrated in FIG. 4.

If the ingredient IDs previously entered by the operator had not already been entered into the Feed Manager program, the program prompts the operator for an ingredient name and adds the name to a database for future reference.

With reference to FIG. 4, the number in the upper left most cell is the vehicle identification number that was set at the start. The top row contains column headings for "Set", "Date", "Ingredient" and the ingredient names previously entered in the manner described above. For each set, the output provides a first row containing the set number, the date, a heading "Weight" beneath the "Ingredient", a heading and a cell beneath each Ingredient name containing the wight of ingredient loaded and a second row having a heading "Time" beneath the "Weight" heading and a cell beneath each ingredient name containing the time the ingredient was loaded into the vehicle container. The next row is another heading row containing "Date", "Time" and "Pen ID" and, in the right-most column, "Ration ID". This header row is followed by one row for each pen to which ration was delivered. It will be noted that there are numbers associated with each ingredient. The numbers were determined by performing the calculation mentioned earlier. The report shows that ration 1 was delivered to four pens and that ration 2 was delivered to two pens.

The Feed Manager determines the beginning of a set by the first positive weight value that is stored. Similarly, it distinguishes ingredients which were loaded into the container from rations discharged by the positive and negative weight values extracted from the data logger. The Feed Manager also automatically sorts the date and the time that the loading and discharge operations occurred and also automatically totals the ingredients loaded. and ration weight discharged to each pen.

This ration ID can be changed before each set or at any time during the data recovery process. However, truck identification is set with the module. The Feed Manager program may also be configured to disable the ingredients data which strips to produce a report such as shown in FIG. 5.

The Feed Manager program includes an option for storing to disk the data recovered from the data logger, for clearing the data logger memory, setting the time and date in the data logger from the computer so that the user need not manually set the time and date and to set the vehicle identification code ID.

It will be understood that various modifications and alterations may be made to the above described invention without departing from the spirit of the invention as defined in the appended claims.

I claim:

1. A data logging device for logging data associated with material added to and removed from a material transport vehicle having a container and an electronic weigh scale for generating a signal representative of the weight of said material in said container, the data logging device comprising:

a display and user input device;

means for calculating the weight of each of a plurality of ingredients successively added to said container, said means for calculating being responsive to an increase in said signal for each of said plurality of ingredients;

means for storing a plurality of identification codes input on said display and user input device, each identification code being stored in association with the calculated weight of one of said ingredients added to said container; and means for displaying the weight of a ration discharged from said container, said means for displaying responsive to a decrease in said signal and responsive to an input destination site identification code for storing said destination site and the weight of said ration discharged at said site, wherein said ration comprises a blend of said plurality of ingredients.

2. The data logging device according to claim 1, further comprising:

means for calculating the weight of each ingredient contained in said ration discharged at said site; and means for storing the weight of each ingredient contained in said ration discharged at said site in association with a site identification code and the weight of said ration discharged at said site.

3. The data logging device according to claim 2, further comprising means for associating an increase in said signal with the addition of one of said plurality of ingredients to said container and for associating a decrease in said signal with the discharge of feed ration from said container at a site.

4. The data logging device according to claim 3, further comprising means for associating a sequence of additions of ingredients to said container followed by a sequence of ration discharges from said container with a set.

* * * * *